United States Patent
Abbott et al.

(10) Patent No.: US 10,489,122 B1
(45) Date of Patent: Nov. 26, 2019

(54) INLINE TEXT EDITOR ELEMENTS AS AN ABSTRACTION LAYER FOR GRAPHICAL CODE EDITING

(71) Applicant: Devin Abbott, San Mateo, CA (US)

(72) Inventors: Devin Abbott, San Francisco, CA (US); Gavin Owens, San Francisco, CA (US)

(73) Assignee: Devin Abbott, San Mateo, CA (US)

( * ) Notice: Subject to any disclaimer, the term of this patent is extended or adjusted under 35 U.S.C. 154(b) by 77 days.

(21) Appl. No.: 15/243,843

(22) Filed: Aug. 22, 2016

Related U.S. Application Data

(60) Provisional application No. 62/213,183, filed on Sep. 2, 2015.

(51) Int. Cl.
 *G06F 8/33* (2018.01)
 *G06F 8/34* (2018.01)
 *G06F 3/0482* (2013.01)

(52) U.S. Cl.
 CPC .............. *G06F 8/33* (2013.01); *G06F 3/0482* (2013.01); *G06F 8/34* (2013.01)

(58) Field of Classification Search
 CPC ...................................... G06F 8/33; G06F 8/34
 See application file for complete search history.

(56) References Cited

U.S. PATENT DOCUMENTS

| | | | | |
|---|---|---|---|---|
| 7,370,315 B1* | 5/2008 | Lovell | .................. | G06F 8/33 715/763 |
| 8,739,121 B1* | 5/2014 | Jones | .................. | G06F 8/73 717/110 |
| 9,026,992 B2* | 5/2015 | Bragdon | .................. | G06F 8/33 717/113 |
| 9,317,257 B2* | 4/2016 | Bragdon | .................. | G06F 8/33 |
| 9,372,673 B2* | 6/2016 | Bertilsson | .............. | G06F 8/34 |
| 9,430,194 B1* | 8/2016 | Childs | .................. | G06F 8/34 |
| 9,940,216 B2* | 4/2018 | Frenkiel | .................. | G06F 8/20 |
| 9,971,572 B2* | 5/2018 | Childs | .................. | G06F 8/33 |
| 10,114,619 B2* | 10/2018 | Nayak | .................. | G06F 8/35 |
| 10,209,965 B1* | 2/2019 | Bienkowski | .............. | G06F 8/33 |
| 2002/0007483 A1* | 1/2002 | Lopez | .................. | G06F 8/31 717/122 |
| 2003/0079199 A1* | 4/2003 | Barsness | .................. | G06F 8/33 717/100 |

(Continued)

*Primary Examiner* — Matthew J Brophy
(74) *Attorney, Agent, or Firm* — Brown, Neri, Smith & Khan, LLP; Ryan Abbott

(57) ABSTRACT

A system and method for creating or editing software code comprising an in-line text editor element ("Smart Object") that represents code, whereby users may edit the code represented by a Smart Object by editing the Smart Object. In various embodiments, tools for editing Smart Objects are located outside of a text editor; storage of Smart Objects may be handled automatically by an IDE without requiring a user to specify a file name or location; users may edit Smart Objects using a GUI; Smart Objects may represent code with nested Smart Objects; Smart Objects may add functionality to represented code; code represented by Smart Objects may be executed in isolation from the rest of an application's code; Smart Objects can be edited by interacting with executed code; executed code may be edited in real time by editing Smart Objects; and additional code can be added to the code represented by a Smart Object during compilation or execution of code.

20 Claims, 20 Drawing Sheets

(56) References Cited

U.S. PATENT DOCUMENTS

| | | | | |
|---|---|---|---|---|
| 2005/0028107 A1* | 2/2005 | Gomes | G06F 11/3664 | 715/762 |
| 2005/0044528 A1* | 2/2005 | Olsen | G06F 8/75 | 717/109 |
| 2008/0066062 A1* | 3/2008 | Zatloukal | G06F 8/33 | 717/143 |
| 2008/0172660 A1* | 7/2008 | Arning | G06F 8/33 | 717/144 |
| 2008/0320442 A1* | 12/2008 | Lyon-Smith | G06F 8/33 | 717/109 |
| 2009/0204926 A1* | 8/2009 | Cochrane | G06F 8/33 | 715/781 |
| 2011/0167404 A1* | 7/2011 | Liu | G06F 8/33 | 717/106 |
| 2011/0197178 A1* | 8/2011 | Johnston | G06F 8/33 | 717/123 |
| 2011/0265070 A1* | 10/2011 | Meijer | G06F 8/314 | 717/159 |
| 2011/0314373 A1* | 12/2011 | Prophete | G06F 9/451 | 715/273 |
| 2012/0198419 A1* | 8/2012 | Neill | G06F 17/276 | 717/109 |
| 2012/0284689 A1* | 11/2012 | Armstrong | G06F 8/33 | 717/113 |
| 2012/0290959 A1* | 11/2012 | Quine | G06F 8/34 | 715/765 |
| 2012/0311533 A1* | 12/2012 | Fanning | G06F 8/33 | 717/111 |
| 2013/0268912 A1* | 10/2013 | Kizhakkevalappil | G06F 8/34 | 717/109 |
| 2013/0346942 A1* | 12/2013 | Bragdon | G06F 8/33 | 717/113 |
| 2014/0149969 A1* | 5/2014 | Brower | G06F 8/423 | 717/140 |
| 2014/0250422 A1* | 9/2014 | Bank | G06F 9/451 | 717/109 |
| 2014/0282377 A1* | 9/2014 | Hammontree | G06F 8/33 | 717/109 |
| 2014/0282378 A1* | 9/2014 | Hammontree | G06F 8/33 | 717/109 |
| 2014/0282387 A1* | 9/2014 | Hammontree | G06F 8/33 | 717/113 |
| 2014/0317045 A1* | 10/2014 | Quine | G06F 16/212 | 707/601 |
| 2014/0359573 A1* | 12/2014 | Ajith Kumar | G06F 11/3612 | 717/113 |
| 2015/0227349 A1* | 8/2015 | Bragdon | G06F 8/33 | 717/113 |
| 2015/0347100 A1* | 12/2015 | Quine | G06F 8/34 | 715/763 |
| 2015/0363175 A1* | 12/2015 | Klausner | G06F 8/34 | 717/109 |
| 2016/0026439 A1* | 1/2016 | Zaydnnan | G06F 8/33 | 717/113 |
| 2016/0291942 A1* | 10/2016 | Hutchison | G06F 8/451 | |
| 2017/0024195 A1* | 1/2017 | Yuen | G06F 8/33 | |
| 2017/0039040 A1* | 2/2017 | Nayak | G06F 8/35 | |
| 2017/0091159 A1* | 3/2017 | Su | G06F 17/2247 | |
| 2017/0116109 A1* | 4/2017 | Perez Acosta | G06F 8/42 | |
| 2017/0123761 A1* | 5/2017 | Childs | G06F 8/33 | |
| 2017/0123762 A1* | 5/2017 | Drukman | G06F 8/31 | |
| 2017/0212730 A1* | 7/2017 | Kizhakkevalappil | G06F 8/34 | |

* cited by examiner

Figure 1

```
main.js
```

```
1   var myLayer = new Layer({
2       width: 200,
3       height: 200,
4       x: 20,
5       y: 20,
6       color: "rgba(0,0,255,0.2)"
7   });
8
9
10
```

Figure 5

| main.js | Layer | | Layer Properties |

```
 1   new Layer({
 2       width: (Width),
 3       height: (Height),
 4       x: (X),
 5       y: (Y),
 6       color: (Color)
 7   });
 8
 9
10
```

Layer Position

| 20 | 20 |
| X | Y |

Layer Dimensions

| 200 | 200 |
| Width | Height |

Layer Color

■ (Color picker)

Figure 6

| main.js | Layer |
|---|---|
| 1 | `new Layer({` |
| 2 | `    width: ` Width , |
| 3 | `    height: ` (Height) |
| 4 | `    x: ` (X) , |
| 5 | `    y: ` (Y) , |
| 6 | `    color: ` (Color) |
| 7 | `});` |
| 8 | |
| 9 | |
| 10 | |

Width Properties

| Value | 200 |
|---|---|
| Type | Number |
| Editor | Input Field |
| Group | Dimensions |

Convert to Code

Figure 7

| | main.js | Layer | | Width Properties | |
|---|---|---|---|---|---|
| 1 | new Layer({ | | | Value | rgba(0,0,255,0.2) |
| 2 | width: (Width), | | | | |
| 3 | height: (Height), | | | Type | String |
| 4 | x: (X), | | | | |
| 5 | y: (Y), | | | Editor | Color Picker |
| 6 | color: Color | | | | |
| 7 | }); | | | Group | Color |
| 8 | | | | | |
| 9 | | | | Convert to Code | |
| 10 | | | | | |

Figure 8

Compiled Output

```
1   var myLayer = (function() {
2       // Wrap Layer with more features
3       // by overriding variables in scope
4       var Layer = LiveReloadLayer;
5
6       // User code
7       var a = new Layer({
8           width: 200,
9           height: 200,
10          x: 20,
11          y: 20,
12          color: "rgba(0,0,255,0.2)"
13      });
14
15      // Automatically call methods
16      a.setupLiveReloading();
17      a.calculateLayout();
18
19      return a;
20  })();
```

Figure 9

```
     main.js
 1   var myLayer =
 2       Layer
 3         Layer 2
 4           Layer 3
 5           Layer 4
 6         Layer 5
 7           Layer 6
 8
 9
10
```

Figure 10

Compiled Output

```
1    var myLayer = (function() {
2        // Declare layers
3        var layer = new Layer(...);
4        var layer2 = new Layer(...);
5        var layer3 = new Layer(...);
6        var layer4 = new Layer(...);
7        var layer5 = new Layer(...);
8        var layer6 = new Layer(...);
9
10       // Automatically setup hierarchy
11       layer.children = [layer2, layer5];
12       layer2.children = [layer3, layer4];
13       layer5.children = [layer6];
14
15       return layer;
16   })();
17
18
19
20
```

Figure 11

```
     main.js
 1   var myLayer =
 2      Layer
 3         Layer 2  *3
 4
 5
 6
 7
 8
 9
10
```

Figure 12

```
1    var myLayer = (function() {
2        // Declare layers
3        var layer = new Layer(...);
4
5        // Create 3 copies of Layer 2
6        var layer2list = [];
7        for (var i = 0; i < 3; i++) {
8            layer2list.push(new Layer(...));
9        }
10
11       // Automatically setup hierarchy
12       layer.children = layer2list;
13
14       return layer;
15   })();
16
17
18
19
20
```
Compiled Output

Figure 14

| main.js | Layer 2 |

```
1    new Layer({
2        width: (Width),
3        height: (Height),
4        x: (X),
5        y: (Y),
6        color: (Color)
7    });
8
9
10
11
12
13
```

Layer 2 Properties

Layer 2 Position

| 75 | 75 |
| X | Y |

Layer 2 Dimensions

| 100 | 100 |
| Width | Height |

Layer 2 Color

▭ (Color picker)

Application Preview

Layer 2

Figure 15

| main.js | | | | Contacts API Properties | |
|---|---|---|---|---|---|
| 1 | var myContactsList = | | | URL | http://api.contacts. |
| 2 | (Contacts List) <- (Contacts API) | | | API Key | AIFO873239586S |
| 3 | | | | Version | v4 |
| 4 | | | | | |
| 5 | | | | | |
| 6 | | | | Cache | Update Hourly |
| 7 | | | | Prefetch | On App Launch |
| 8 | | | | | |
| 9 | | | | | |
| 10 | | | | | |
| 11 | | | | | |
| 12 | | | | Convert to Code | |
| 13 | | | | | |

Application Preview

- Adam Smith
- Alex Jacobs
- Ben Winn
- Catherine Starr
- Kevin Michaels
- Sam Porter

Figure 17

| main.js | Layer (200,200) | Layer Properties |
|---|---|---|

```
1   new Layer({
2       width: (Width),
3       height: (Height),
4       x: (X),
5       y: (Y),
6       color: (Color)
7   });
8
9
10
11
12
13
14
15
```

Layer Position

| 20 | 20 |
|---|---|
| X | Y |

Layer Dimensions

| 200 | 200 |
|---|---|
| Width | Height |

Layer Color

■ (Color picker)

Smart Object Metadata

Name  [ Layer ({width}, {height}) ]

Icon  ⌘  [ Set Icon... ]

Figure 18

| main.js | | Contacts API Properties | |
|---|---|---|---|
| 1 | var myContactsList = (Contacts List) | URL | http://api.contacts. |
| 2 | | | |
| 3 | (Contacts API) | API Key | AIFO873239586S |
| 4 | | | |
| 5 | | Version | v4 |
| 6 | | | |
| 7 | | Cache | Update Hourly |
| 8 | | Prefetch | On App Launch |
| 9 | | | |
| 10 | | | |
| 11 | | | |
| 12 | | | Convert to Code |
| 13 | | | |

Figure 20

```
     main.js < Layer 1 < Layer 2 < Layer 3

1   // This code is the isolated code of
 2   // the Smart Object named "Layer 3"
 3   var myLayer = ( Layer )
 4
 5
 6
 7
 8
 9
10
```

INLINE TEXT EDITOR ELEMENTS AS AN ABSTRACTION LAYER FOR GRAPHICAL CODE EDITING

RELATED APPLICATION DATA

This application claims priority to provisional application 62/213,183, filed Sep. 2, 2015. The disclosure of said provisional application is incorporated herein by reference.

FIELD OF INVENTION

The present specification relates to methods and systems for creating or editing software code, and specifically to in-line objects that represent code where users may edit code by editing representative objects.

BACKGROUND

Inline Code Folding Widgets

Software developers generally write software applications using text editors, which are systems or programs that allow a user to edit code as text. Text editors may be terminal-based, or may provide a Graphical User Interface (GUI). In most instances, text editors will display code as a simple editable text area and provide syntax highlighting. Sometimes these text editors are part of a larger application, an Integrated Development Environment (IDE), which typically consist of a text editor, a compiler, a debugger, and a GUI. IDEs offer the user additional features for editing, running, compiling, and debugging code, often through the use of the IDE's GUI.

Code folding is a feature of IDEs that replaces large portions of text with "inline widgets." A widget is a component of a GUI that enables a user to perform a function. Inline widgets are parts of the text editing environment that generally behave like normal text except that they can be expanded and collapsed to hide or reveal "folded" (temporary hidden) code. For example, code folding (in JetBrains' IntelliJ) collapses inner Java classes to "~>" to hide code which the user does not need to see very frequently. Hovering the mouse over the inline widget will reveal a preview of the code that has been folded. This is the extent of the functionality of inline widgets in most existing code editing software.

IDEs With Visual Code Editing Tools

IDEs such as Visual Studio, Dreamweaver, or more recently Adobe Edge, have attempted to let the user edit both code and visual properties (such as colors, sizes, and positions of components in the application being developed) in the same tool. Here, the IDE scans the user's code and when the user's cursor enters a certain text range, the IDE will display related details about what the code represents in the component being developed (e.g., color, size, positioning) in an inspector view (an inspector is part of the IDE's GUI which shows properties of the code and application currently being edited and the inspector may allow these properties to be edited through the inspector). This is potentially problematic from the user's perspective, since it is unclear exactly which parts of their code are special and match up to visual properties in the inspector. An additional problem relates to storing the visual properties added/modified by the inspector: the editor must either place all of the visual properties as code in the text editor for them to be saved (in which case, cluttering the user's code), or they must be saved outside of the user's code (e.g., a separate CSS file) which would require the user to find and open another file. With this method of providing GUI editing tools for code, it is difficult for the IDE to seamlessly provide abstractions and additional features through code generated by the IDE without exposing said generated code to the user.

Visual Programming Environment

Visual programming environments like Quartz Composer by Apple, Inc., or RelativeWave Flow (now owned by Google) introduced a programming environment that does not use a text editor as the primary means of developing an application. Instead, these tools use a variety of widgets in the GUI, which a user can connect to one another in order to build an application. While these tools offer features around understanding and inspecting the state of a running application, they do not provide the power and flexibility of being able to edit the underlying code. A user has no way to write an application almost entirely in code with these tools, which is often a faster and more effective means of developing an application. If the user wants to do something not supported by the visual programing environment they are unable simply to take their code into another environment and continue working on it there, because they do not have access to the majority of the application's code.

SUMMARY

We have developed a new programming paradigm that utilizes a novel type of inline text editing element which we refer to as a "Smart Object." Smart Objects provide additional functionality and features in a text editor, IDE, or other code editing software beyond what code folding and visual code editing tools provide. In some embodiments, Smart Objects allow GUI editing of colors and numbers, automatically updating the application's visual preview as code is changed. Features such as these are achieved through compilation of the folded code within a Smart Object that may consist of swapping the Smart Object with the folded code it represents, or may be more advanced than swapping a Smart Object with the folded code it represents. In some embodiments, Smart Objects may be nested inside one another, and compilation will recursively replace the Smart Objects with the code represented by the Smart Objects (or additional/related code). In some embodiments, the compilation process replaces variables in the scope of the code represented by the Smart Object, automatically calls methods or provides additional logic around the user's code, and treats Smart Objects as a special programming language token distinct from other tokens in the programming language. Smart Objects can be created by the user, or users can insert Smart Objects into their code. In some embodiments, Smart Objects can be inserted by the users through utilization of the GUI. In some embodiments, an IDE can insert Smart Objects automatically. Smart Objects can be created or edited by users, and shared (e.g., via a software package management, version control system, or web service provided by the IDE itself) with other users using code editing software which supports Smart Objects. In some embodiments, Smart Objects can be persisted to disk and shared as files that are read and incorporated by an IDE.

BRIEF DESCRIPTION OF THE DRAWINGS

These figures depict certain embodiments of the present invention here using a sample code editing program which supports Smart Objects. In these embodiments, the code is written using JavaScript (ECMAScript 5) syntax and a hypothetical graphical JavaScript framework where "Layer" represents a visual component in the application being developed. Compiled code is also in JavaScript and demonstrates the advantages of using Smart Objects to provide additional features through compilation. However, Smart Objects can be used with any programming language (the exact compilation techniques used may differ in each language), and are not limited to representing visual components such as the hypothetical "Layer".

FIG. 1 depicts sample code written in a sample IDE without a Smart Object.

FIG. 3 demonstrates some of the benefits of Smart Objects, including folding code and improving the user's experience with a name for the folded code (in this case, "Layer").

FIG. 5 depicts one embodiment of a Smart Object in which by double-clicking the Smart Object in FIG. 4, the user can drill down into the Smart Object and edit its code. In this case, the code may be edited as text in isolation from other code in the text editor. In some embodiments, there may be Smart Objects nested within Smart Objects that can be edited through the GUI, property inspector, or in isolation from other code in the text editor. In some embodiments, if the user has not selected a specific Smart Object in this isolated text, the property inspector may show the properties of the current Smart Object that the user has drilled down into.

FIG. 6 depicts one embodiment of a Smart Object in which clicking or otherwise selecting a specific Smart Object reveals the editable properties of the Smart Object in the GUI. Some of these are editable "metadata", which control how the Smart Object can or should be edited in the GUI rather than how the code for the Smart Object should be compiled. Metadata can also be used to declare which properties of nested Smart Objects should be visible to the containing Smart Object.

FIG. 7 depicts one embodiment of a Smart Object in which a nested Smart Object represents a color. Even though the Smart Object represents code with a primitive type of "String", the user specifies via the metadata properties that this Smart Object should be edited using a color picker.

FIG. 8 depicts one embodiment in which code for a sample program is compiled, and in which the Smart Object adds code to the code represented by the Smart Object. The IDE may add code in order to make the development experience more powerful or to add support for IDE functionality, or to compile the Smart Object for different build targets.

FIG. 9 depicts one embodiment of a special structure of code that applies exclusively to Smart Objects in this program, but not to normal JavaScript. Because this program helps the user write graphical applications, it supports writing Smart Objects in a whitespace-sensitive syntax that mirrors the hierarchy of graphical elements in the application being developed.

FIG. 10 depicts one embodiment of the compiled output of FIG. 9.

FIG. 11 depicts one embodiment of a Smart Object being used as a new token in the JavaScript programming language which supports repetition through the multiplication operator.

FIG. 12 depicts one embodiment of the compiled output of FIG. 11.

FIG. 14 depicts one embodiment of a user drilling down into the "Layer 2" Smart Object from FIG. 13. In addition to showing the code within the Smart Object, the application preview isolates just the part of the application represented by the "Layer 2" Smart Object. This enables a development workflow where the user can focus on individual components in isolation to make sure that they are properly encapsulated. This will reduce the time it takes to find and fix bugs in the application, since it is generally easier to find bugs in a component in isolation than when run as part of a larger application. It also encourages the development of completely standalone and reusable components, since through this isolation feature, components may be designed to run in isolation in addition to running as part of a larger application.

FIG. 15 depicts one embodiment of how Smart Objects can be used for non-visual components. Here, a Smart Object represents a Contacts Application Programming Interface (API), and allows the user to conveniently edit the API endpoint, API key, and other configuration properties and parameters without editing the underlying code. Additional configuration about how the data is brought into the application and cached can also be editable in the Smart Object editing GUI. In the text editor, special language syntax (e.g., "Smart Object<-Smart Object") could be added to support easily transforming data and inserting it into other Smart Objects.

FIG. 17 depicts one embodiment of editing a Smart Object's name and icon which are computed dynamically. In this embodiment, the name of the Smart Object is a template that uses the width and height properties of the Smart Object to dynamically update the name. The icon for the Smart Object may be set by the user or implicitly set by the IDE and it may be a static asset or generated dynamically based on the Smart Object's properties or underlying code.

FIG. 18 depicts one embodiment of the IDE presenting additional metadata around Smart Object properties such as documentation and input validation so that a user can correctly use the Smart Object without understanding its code. The documentation and input validation rules may be set by the user as metadata of the Smart Object or may be determined automatically by the IDE.

FIG. 20 depicts one embodiment of nested Smart Objects that have been repeatedly "drilled down" into, one after another. The names of each Smart Object are used for the title of the text editor, which can be clicked to navigate to the files and Smart Objects represented by those names in the hierarchy of nested Smart Objects. The code for the deepest nested Smart Object is shown in isolation in the text editor.

DETAILED DESCRIPTION

Figure 4:
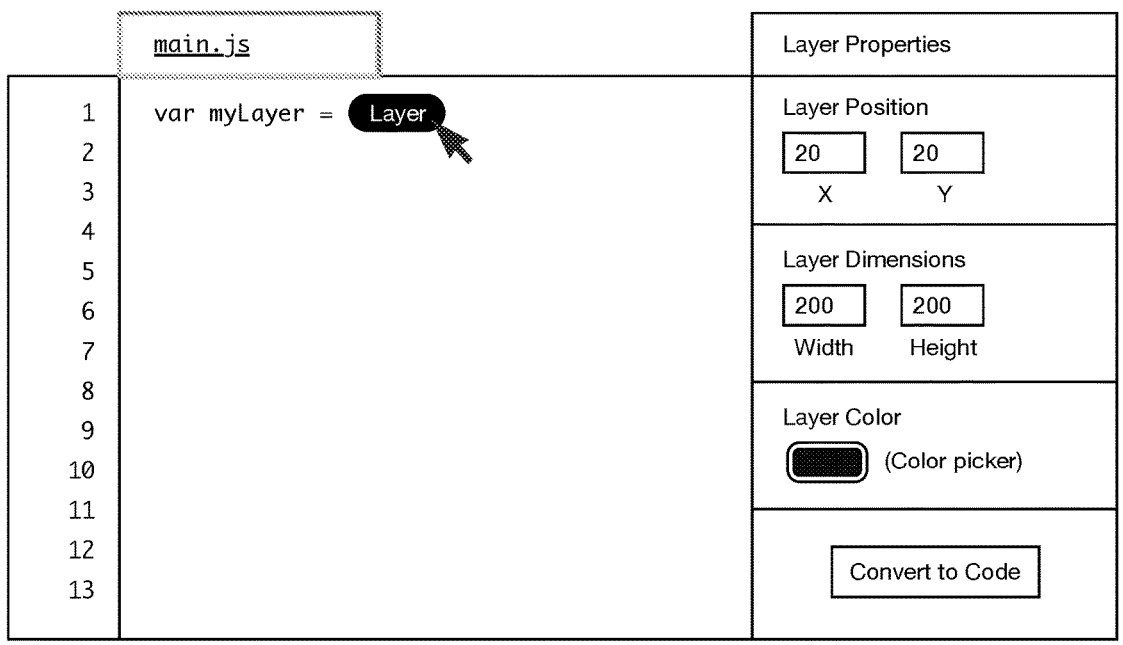
FIG. 4 depicts one embodiment of a Smart Object in which clicking or otherwise selecting the Smart Object will cause a property inspector to appear that will allow a user to edit the underlying code in the property inspector of the GUI.

Smart Objects are capable of being atomic with regards to editing code as text; Smart Objects may behave similarly to a single character in the text editor. FIG. 4 depicts an embodiment of inline Smart Objects. In some embodiments, the user's cursor can appear before or after a Smart Object, but it may not enter a Smart Object. The user may delete, cut, copy, and paste Smart Objects as if they were regular text. FIG. 1 depicts an embodiment of regular text.

Figure 16:
FIG. 16 depicts one embodiment of a Smart Object with a label computed dynamically based on the Smart Object's metadata and the properties of the code represented by the Smart Object.

In some embodiments, Smart Objects may have a name or label on its inline text element. This name may be entered manually by the user, or determined automatically by the IDE. The name and any associated iconography may be computed dynamically based on aspects of the code or IDE such as properties and metadata of the Smart Object or the code represented by the Smart Object. FIG. 16 depicts an embodiment of a Smart Object with a name and associated iconography. FIG. 17 depicts how the name of the Smart Object may be used in other parts of the IDE; upon drilling down into a Smart Object, the title of a text editor tab becomes the name of the Smart Object, to indicate that the text editor tab contains the isolated code this Smart Object represents.

Figure 13:
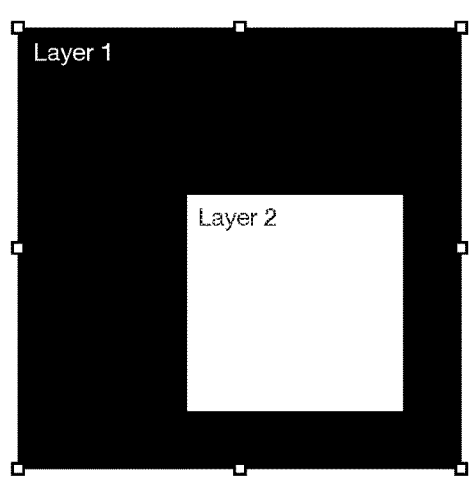
FIG. 13 depicts one embodiment of a visual application preview which immediately updates as the user edits the code or properties in the inspector, and can be used as a graphical editor for the code itself. When the Smart Object for Layer 1 is selected, draggable handles appear around the shape representing Layer 1 in the application preview. This improves the user's understanding of the 1:1 relationship between the code and the Layer it represents in the application preview. The user may drag or resize Layer 1 in the visual preview and this will edit the Smart Object's properties in the code.

In some embodiments, a Smart Object maps 1-to-1 with a visual component. FIG. 13 depicts an embodiment of a Smart Object mapping 1-to-1 with a visual component. If there is a visual preview of the software being developed, in some embodiments, hovering the mouse over a Smart Object highlights the related component in a visual preview. Clicking or selecting a Smart Object may select the component in the visual preview. When a Smart Object is selected, the inspector will contain controls for modifying various properties of the visual component.

In some embodiments, Smart Objects can represent multiple components. In some embodiments, a Smart Object includes a "repeat" property (editable visually or as code) that repeats the visual component represented by the Smart Object an arbitrary number of times as specified by the user or IDE. FIG. 11 depicts an embodiment of a Smart Object that is repeated multiple times and therefore represents multiple components.

Figure 19:
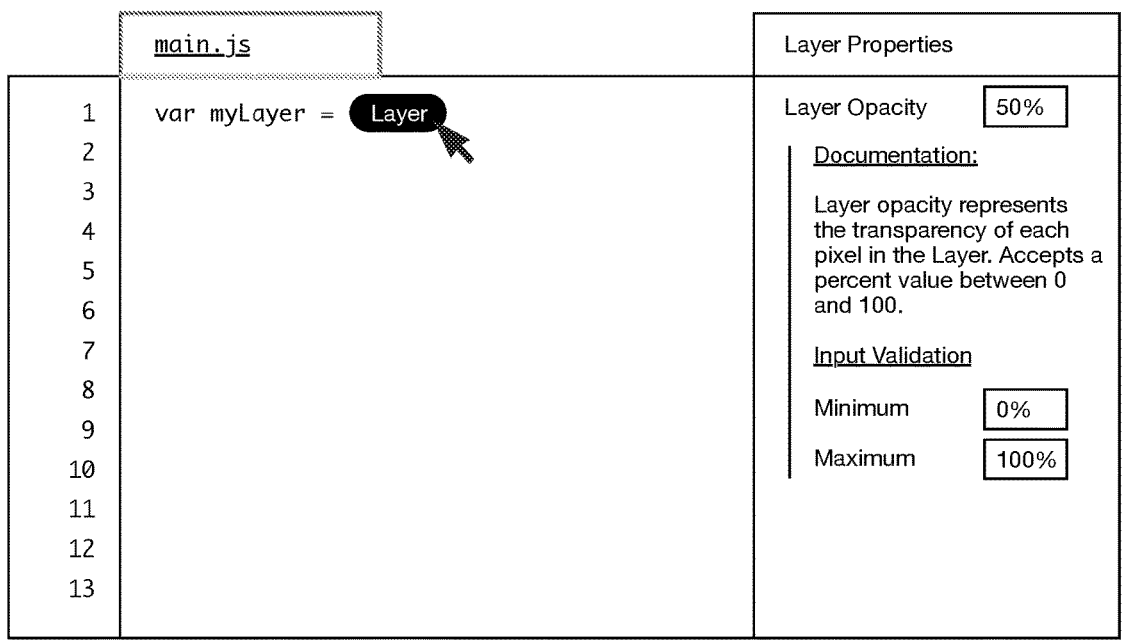
FIG. 19 depicts one embodiment of a GUI mechanism for relating two smart objects to one another. In this embodiment, a line is drawn by the user between circular ports on each Smart Object and this line indicates that the data from one Smart Object is passed to the other Smart Object.

In some embodiments, Smart Objects represent non-visual components. A number or color could be represented as a Smart Object, as there is clear value in providing a GUI editing mechanism around numbers and colors (e.g., sliders and color pickers). FIG. 6 depicts an embodiment of a Smart Object representing a number and FIG. 7 depicts an embodiment of a Smart Object representing a color. A class or an instance of an object without visual properties could be edited as a Smart Object, because Smart Objects are a convenient way to represent the object-oriented programming paradigm (a Smart Object represents an object literal or an instance of a class). An API or other configuration object may be valuable to represent as a Smart Object, since it can graphically represent all the parameters of the API without the user needing to search the API documentation. FIG. 15 depicts an embodiment of an API configuration object. FIG. 18 depicts an embodiment a Smart Object with metadata for its documentation and input validation. FIG. 19 depicts an embodiment of how data can be passed between two Smart Objects which is particularly useful for a Smart Object representing data or an API.

Figure 2:
FIG. 2 depicts one embodiment of a user transforming code into a Smart Object. When the user selects code in the editing software, the user is given the option to create a Smart Object from the selected code. Upon the user electing to create a Smart Object, the code may be automatically scanned to detect editable properties of the selected code, such as number and string literals.
Figure 3:
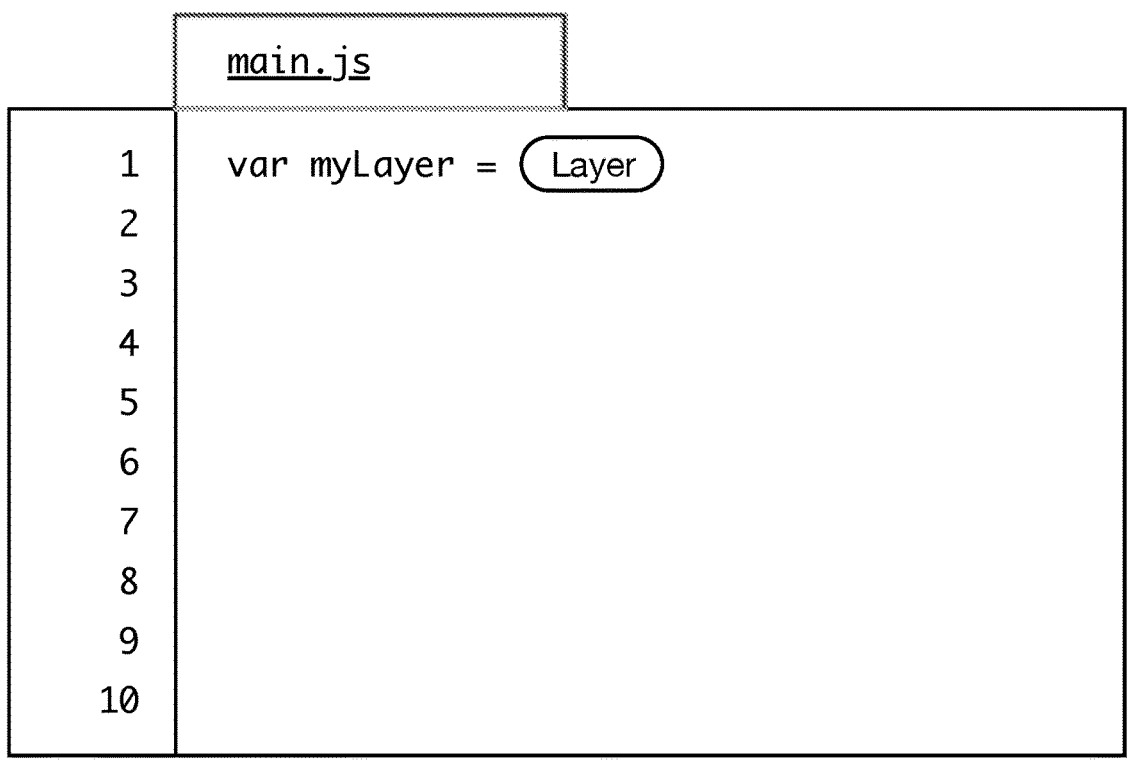
FIG. 3 depicts the code from FIG. 2 transformed into a Smart Object.

In the text editor, a Smart Object may behave in certain respects like folded code. The Smart Object can be converted to code by the user, for example by using a button or other similar GUI element in the editing software. This will replace a Smart Object with the code that Smart Object represented. From the perspective of visual previews or the compiler, the Smart Object may be mapped to an entirely different set of code which allows special features for manipulating visual components. For example, the compiler may produce a completely different set of code for different platforms even though the user just sees one Smart Object and one set of related editable properties. FIG. 2 depicts an embodiment of a button that lets a user create a Smart Object from selected code. FIG. 3 depicts an embodiment a Smart Object. FIG. 4 depicts an embodiment of a button that lets the user replace the Smart Object with the code that the Smart Object represents (labeled "Convert to Code"). FIG. 8 represents an embodiment of compiled code that adds features to the sample code in FIG. 7.

In addition to the user being able to "Convert to Code" and directly replace the Smart Object with the code it represents in the text editor, a user may also be able to "drill down" (in some embodiments by double clicking) into a Smart Object, to edit the code represented by the Smart Object directly. FIG. 5 depicts an embodiment of drilling down into a Smart Object that has nested Smart Objects within it. This provides a convenient mechanism for encapsulating related code without showing it in the text editor. The code represented by a Smart Object may in turn have more Smart Objects within that code. Smart Objects can be nested arbitrarily deep and "drilled down" into to any depth. In some embodiments, the names of the Smart Objects may be used to represent and navigate the hierarchy of nested Smart Objects. FIG. 20 depicts an embodiment of nested Smart Objects names used for the title of the text editor, which can be clicked to navigate to the files and Smart Objects represented by those names. In some embodiments, the IDE's GUI may visually preview the Smart Object that has been "drilled down" into in isolation from the rest of the application. In some embodiments, if the IDE is able to run the application's code, then the IDE may run only the portion of code represented by the Smart Object that has been selected by the user. In such an embodiment, if there is an associated visual preview with that Smart Object, the IDE may show that visual preview in isolation from the rest of the application being developed. FIG. 14 depicts an embodiment of a Smart Object representing a visual component that has been isolated in the application preview.

In some embodiments, Smart Objects can be treated as special language tokens during the parsing and compilation of code. Smart Objects may be an extension of existing programming languages and do not necessarily need to act the same as operators, identifiers, or other existing language tokens (although they can be the same as existing tokens if special distinctions do not provide any value). Additionally, Smart Objects that look different (e.g., inline elements of different shapes, sizes, colors) may also act as separate tokens when parsing and compiling the programming language. FIG. 9 depicts an embodiment of Smart Objects acting as special language tokens where whitespace is used to represent a hierarchy of Smart Objects. FIG. 11 depicts an embodiment of Smart Objects acting as special language tokens with new language rules for dealing with operators. FIG. 10 represents an embodiment of the compiled output of the code in FIG. 9. FIG. 12 represents an embodiment of the compiled output of the code in FIG. 11.

In some embodiments, Smart Objects may be used in control structures such as "for" loops and "while" loops. Used this way, a Smart Object may represent multiple components. The Smart Object may refer to variables used inside the loop, e.g., the height of the previous Smart Object referenced in the loop, in order to automatically compute the layout of all Smart Objects in the loop.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

Variations of the embodiments disclosed herein may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method comprising:
   displaying a window for creating or editing software source code;
   displaying, in the window, and in place of unstructured text, one or more inline text editing Smart Objects, wherein the Smart Objects represent additional source code text not displayed in the window; and,
   compiling the software code to create executable code by:
   1) parsing the one or more Smart Objects to generate executable code corresponding to the additional source code text represented by the one or more Smart Objects
   and 2) further parsing the one or more Smart Objects as tokens according to new language compilation rules, wherein said new language compilation rules include at least one of:
      supporting repetition of the code represented by the one or more Smart Objects using a multiplication operator; and
      supporting transforming data from the one or more Smart Objects and inserting said data into one or more other Smart Objects; and
      supporting creation of a hierarchy of data represented by one or more Smart Objects, using whitespace/indentation to determine the structure of said data.

2. A non-transitory computer readable medium having instructions stored thereon that, when executed by a computing device, cause the computing device to perform operations comprising:
   displaying a window for creating or editing software source code;
   displaying, in the window, and in place of unstructured text, one or more inline text editing Smart Objects, wherein the Smart Objects represent additional source code text not displayed in the window; and,
   compiling the software code to create executable code by:
   1) parsing the one or more Smart Objects to generate executable code corresponding to the additional source code text represented by the one or more Smart Objects
   and 2) further parsing the one or more Smart Objects as tokens according to new language compilation rules, wherein said new language compilation rules include at least one of:
      supporting repetition of the code represented by the one or more Smart Objects using a multiplication operator; and
      supporting transforming data from the one or more Smart Objects and inserting said data into one or more other Smart Objects; and
      supporting creation of a hierarchy of data represented by one or more Smart Objects, using whitespace/indentation to determine the structure of said data.

3. A system comprising:
   a processor;
   a memory having instructions stored thereon that, when executed by the processor, cause the processor to perform operations comprising:
   displaying a window for creating or editing software source code;
   displaying, in the window, and in place of unstructured text, one or more inline text editing Smart Objects, wherein the Smart Objects represent additional source code text not displayed in the window; and,
   compiling the software code to create executable code by:
   1) parsing the one or more Smart Objects to generate executable code corresponding to the additional source code text represented by the one or more Smart Objects
   and 2) further parsing the one or more Smart Objects as tokens according to new language compilation rules, wherein said new language compilation rules include at least one of:

supporting repetition of the code represented by the one or more Smart Objects using a multiplication operator; and supporting transforming data from the one or more Smart Objects and inserting said data into one or more other Smart Objects; and supporting creation of a hierarchy of data represented by one or more Smart Objects, using whitespace/indentation to determine the structure of said data.

4. The method of claim 1 wherein said new language compilation rules include supporting repetition of the code represented by the one or more Smart Objects using a multiplication operator.

5. The method of claim 1 wherein said new language compilation rules include supporting transforming data from the one or more Smart Objects and inserting said data into one or more other Smart Objects.

6. The method of claim 5 wherein transforming data includes retrieving additional data from an external source outside of the source code (e.g., filesystem or remote server).

7. The method of claim 5 wherein transforming data is configurable using the GUI of the code editing software.

8. The method of claim 1 wherein said new language compilation rules include supporting creation of a hierarchy of data represented by one or more Smart Objects, using whitespace/indentation to determine the structure of said data.

9. The method of claim 8 wherein said hierarchy of data represents the UI element hierarchy of a graphical application.

10. The computing device of claim 2 wherein said new language compilation rules include supporting repetition of the code represented by the one or more Smart Objects using a multiplication operator.

11. The computing device of claim 2 wherein said new language compilation rules include supporting transforming data from the one or more Smart Objects and inserting said data into one or more other Smart Objects.

12. The computing device of claim 11 wherein transforming data includes retrieving additional data from an external source outside of the source code (e.g., filesystem or remote server).

13. The computing device of claim 11 wherein transforming data is configurable using the GUI of the code editing software.

14. The computing device of claim 1 wherein said new language compilation rules include supporting creation of a hierarchy of data represented by one or more Smart Objects, using whitespace/indentation to determine the structure of said data.

15. The computing device of claim 14 wherein said hierarchy of data represents the UI element hierarchy of a graphical application.

16. The system of claim 2 wherein said new language compilation rules include supporting repetition of the code represented by the one or more Smart Objects using a multiplication operator.

17. The system of claim 2 wherein said new language compilation rules include supporting transforming data from the one or more Smart Objects and inserting said data into one or more other Smart Objects.

18. The system of claim 17 wherein transforming data includes retrieving additional data from an external source outside of the source code (e.g., filesystem or remote serer).

19. The system of claim 17 wherein transforming data is configurable using the GUI of the code editing software.

20. The system of claim 18 wherein said new language compilation rules include supporting creation of a hierarchy of data represented by one or more Smart Objects, using whitespace/indentation to determine the structure of said data.

\* \* \* \* \*